3,422,063
EPOXIDE RESIN FROM EPICHLOROHYDRIN AND
A MIXTURE OF BISPHENOLS
Oliver A. Barton, Florham Park, and Walter W. Littell,
Mount Tabor, N.J., assignors to Allied Chemical Corporation, New York, N.Y., a corporation of New York
Filed Aug. 3, 1964, Ser. No. 387,153
U.S. Cl. 260—47        10 Claims
Int. Cl. C08g 30/4; C08g 30/14

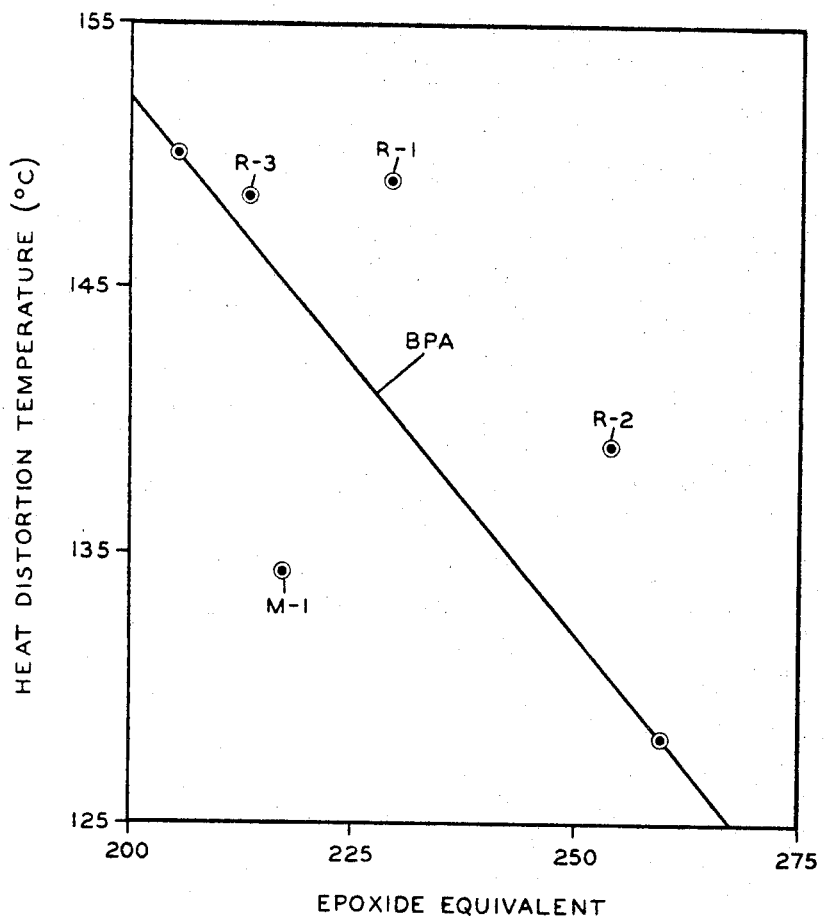

This invention relates to novel epoxide resins and a process for their preparation. More particularly this invention relates to epoxide resins containing 1,4-bis(p-hydroxycumyl)-benzene, which are liquid at room temperature.

Epoxide resins and processes for their preparation by the reaction of dihydric phenols and epichlorohydrin in the presence of an alkali are well known in the prior art. Such resins vary in their physical state from liquid to semi-solids to solids and are generally cured to a thermoset condition by heating in the presence of chemical hardening agents. Resins produced by such curing have a high molecular weight and are particularly suitable for use in adhesives, coatings, encapsulation, potting compounds, and laminates.

It is well known that, by varying the proportions of reactants of dihydric phenol to epichlorohydrin, it is possible to vary the molecular weight of the epoxide formed. To obtain lower molecular weight polymers an excess of epichlorohydrin is used. In general where dihydroxy phenols are used, molecular weight is about two times the epoxide equivalent, which is defined as the weight of resin in grams which contains one gram equivalent of epoxy. Low molecular weight resins having epoxide equivalents of 260 or less, are liquid at room temperature. Such liquids are preferred in a number of applications. Most important they can be poured or flowed into place without being dissolved in a solvent or liquefied by preheating. Additionally, when employing a highly reactive curing agent such as diethylene triamine, preheating of the epoxide resins to obtain a liquid prior to incorporation of the curing agent increases the curing rate to the extent that it is difficult to utilize the resin before it crosslinks into a solid material.

In addition to affecting the melting point of the uncured monomer, the epoxide equivalent affects many of the properties of the cured polymer prepared therefrom. As epoxide equivalent decreases, the proportion of reactive epoxide groups present becomes greater and the extent of crosslinking which can be obtained increases. Among the properties which substantially depend upon the extent of crosslinking are the heat distortion temperature and the tensile strength, which, all other conditions being equal, increase with decreasing epoxide equivalent. Although many of the physical properties improve with decreasing epoxide equivalent, the presence of more reactive epoxide groups for a given weight of resin results in a product which cures faster with greater shrinkage. In many applications such as in casting a large article, the amount of shrinkage is critical, and in such cases the highest molecular weight resin having satisfactory properties is selected. Thus, in choosing between epoxide resins derived from different polyphenolic compounds, the properties are usually compared for resins which have the same epoxide equivalents and, therefore, have approximately the same shrinkage characteristics.

In copending United States application Number 159,775, filed December 15, 1961, there is disclosed an epoxide resin prepared by reacting epichlorohydrin with 1,4-bis(p-hydroxycumyl)-benzene, a dihydric phenol, represented by the formula:

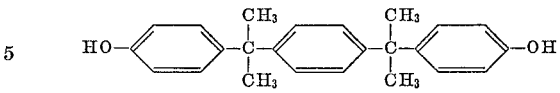

These epoxide resins possess excellent physical properties including higher heat distortion temperatures than epoxide resins of the same epoxide equivalents prepared from 2,2-bis(p-hydroxyphenyl)-propane, a dihydric phenol hereinafter referred to as Bisphenol A. Because of the high molecular weight of 1,4-bis(p-hydroxycumyl)-benezene, the epoxide resins which have been prepared therefrom have had a minimum epoxide equivalent of about 270, and are solid at room temperature. The necessity of liquefying this monomer by preheating or the use of a solvent in order to incorporate a curing agent presents a drawback to its use in the preparation of cured epoxide polymers.

It is therefore an object of this invention to provide novel epoxide resins containing epoxidized 1,4-bis(p-hydroxycumyl)-benzene which are liquid at room temperature.

Another object of this invention is to provide an epoxide resin containing epoxidized 1,4-bis(p-hydroxycumyl)-benzene which can be cured to give a polymer having a high heat distortion temperature.

Additional objects and advantages of the present invention will become apparent from the following detailed description thereof.

In accordance with the present invention, epoxide resins which are liquid at room temperature are prepared by interacting in liquid phase a mixture of 1,4-bis(p-hydroxycumyl)-benzene, Bisphenol A, and epichlorohydrin. The reaction can be conducted at a temperature of about 50° to 150° C., with the preferred temperature range being about 65° to 100° C. In order to obtain a liquid resin, an excess of epichlorohydrin should be used, and at least about 0.5 mol of Bisphenol A should be present for each mol of 1,4-bis(p-hydroxycumyl)-benzene. Preferably 5 to 20 mols of epichlorohydrin are employed for each mol of dihydric phenol and about 0.5 to 2.0 mols of Bisphenol A are used for each mol of 1,4-bis(p-hydroxycumyl)-benzene. The 1,4-bis(p-hydroxycumyl)-benzene can be prepared by reacting the dicarbinol of 1,4-diisopropyl-benzene with phenol in the presence of HCl as described in detail in co-pending application 140,211, filed September 25, 1961.

The reaction between the dihydric phenols and epichlorohydrin must be carried out in the presence of an alkali, preferably an alkali metal hydroxide such as sodium hydroxide, potassium hydroxide and lithium hydroxide. The alkali is used in an amount sufficient to neutralize the hydrochloric acid produced during the reaction and to transform the chlorohydrin formed on initial reaction of the dihydric phenol with epichlorohydrin to an epoxide-containing molecule. In general it is preferred to use about 2 to 4 mols of alkali per mol of bisphenolic compound.

It has been found preferable to have some water present in the reaction mixture to aid in the initiation of the reaction. Quantities of water equal to at least 0.3% of the total weight of the reaction mixture have proven effective. In the preparation of low epoxide equivalent resins such as those of the present invention, it is best to limit the maximum quantity of water present to 5% of the total weight of the reactants.

The crude reaction product obtained by this invention contains salts, excess alkali, unreacted epichlorohydrin, and water, all of which impurities should be substantially removed. This purification can be accomplished by filtering out the solids present and then removing the water and unreacted epichlorohydrin by distillation. The resin can be further purified by dissolving it in a solvent such as acetone, filtering out any solids present and then distilling off the acetone. The final resin obtained has an epoxide equivalent within the range of about 200 to about 260.

Although the molecular weight of our epoxide resin is below that which would result if every molecule of the resin represented a terpolymer of 1,4-bis(p-hydroxycumyl)-benzene, Bisphenol A and epichlorohydrin, it is believed that a portion of the resin is composed of this terpolymer and that the presence of this terpolymer contributes to the outstanding properties of the resin. It is further believed that all or most of this terpolymer is a diglycidyl ether of the formula:

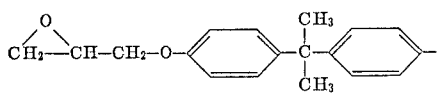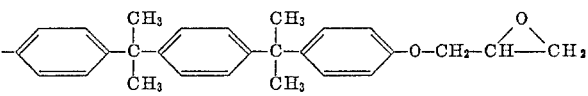

with any remaining terpolymer being a higher molecular weight diglycidyl ether containing more than one 2,2-diphenylpropane group and/or 1,4-dicumylbenzene group.

In order to distinguish our epoxide resins from a mixture of Bisphenol A epoxide resin and 1,4-bis(p-hydroxycumyl)-benzene epoxide resin, comparative tests were run between a resin prepared by interacting two parts of Bisphenol A, one part of 1,4-bis(p-hydroxycumyl)-benzene and 30 parts of epichlorohydrin in accordance with the procedure of this invention, and a resin which was a mixture of the first epoxide resin prepared from two parts of Bispenol A and 20 parts of epichlorohydrin and a second epoxide resin prepared from one part of 1,4-bis(p-hydroxycumyl)-benzene and 10 parts of epichlorohydrin. In addition to differences in the infrared spectrum, the two resins differed with regard to all of the physical properties measured. The most outstanding of these differences was the substantially higher heat distortion temperature obtained after curing the epoxide of the present invention, despite the fact that there was very little difference between the epoxide equivalents of the compared resins. Additionally, it was found that the above mixture of epoxides distilled out at 218° C. and 1 mm. of pressure to give a clear distillate of Bisphenol A while upon similarly heating the interacted epoxide of this invention to 218° C. at 1 mm. pressure, no distillate was obtained.

To further demonstrate the superior properties of the epoxide resins of the invention, comparative tests were made with epoxide resins prepared by the reaction of Bisphenol A and epichlorohydrin. These tests indicated that at the same epoxide equivalents, the resins of this invention had unexpectedly higher heat distortion temperatures after curing.

The epoxide resins of this invention can be cured to form a high molecular weight polymeric product with a great variety of curing agents including amino compounds such as diethylene triamine, diethylamino propylamine, ethylene diamine, triethylene tetramine, dimethylamino, propylamine, m-phenylene diamine, triethylamine and benzyldimethylamine; polycarboxylic acids such as oxalic acid; organic acid anhydrides such as phthalic anhydride; polyamides having reactive amine groups such as dicyanadiamide and the reaction product of linoleic acid dimer and ethylene diamine; Friedel-Crafts metal halides such as aluminum chloride, zinc chloride, ferric chloride and boron trifluoride as well as complexes thereof with ethers, acid anhydrides, ketones, diazonium salts, etc.; phosphoric acid and partial esters thereof such as n-butyl orthophosphate; and salts of inorganic acids such as zinc fluoborate, potassium persulfate, nickel fluoborate, copper fluoborate, selenium fluoborate, magnesium fluoborate, tin fluoborate, potassium magnesium arsenate, magnesium sulfate, cadmium arsenate, cadmium silicate, aluminum fluoborate, ferrous sulfate, ferrous silicate, manganese hypophosphite, nickel phosphate and nickel chlorate. The preferred class of curing agents is the amino compounds. A number of these amino compounds, such as diethylene triamine and diethyl amino polyamine, are sufficiently active to effect curing at room temperature and such systems can be used for adhesives and other uses where it is usually not practical to require preheating. When using an amine curing agent, it is best to provide one active hydrogen for each epoxide group of the resin. Thus, when curing a resin with an epoxide equivalent of 200 with m-phenylene diamine, which has four active hydrogens and a molecular weight of 108, about 13.5 parts of the curing agent should be used per 100 grams of resin. The amount of curing agent can be varied somewhat, but the variation should not be greater than about ±20%.

The epoxide resins can be modified by reacting them with conventional epoxide modifying agents. Additionally, the physical properties of the resin can be changed by dissolving therein a solid epoxide resin of higher epoxide equivalent.

The following examples are given to further illustrate the invention, but it is to be understood that the invention is not to be limited in any way by the details described therein.

EXAMPLE 1

To a resin flask provided with a stirrer, thermometer, condenser and heating mantle were added .3 mol of 1,4-bis(p-hydroxycumyl)-benzene, .3 mol of 2,2-bis(p-hydroxyphenyl)-propane and 6 mols of epichlorohydrin. The mixture was stirred for one hour at 90°–95° C. 1.32 mols of sodium hydroxide as a 90% aqueous solution were added slowly over a one-hour period, and stirring continued for one half hour. The mixture was then cooled to room temperature.

The solution was filtered to remove undissolved salt and sodium hydroxide and the excess water and epichlorohydrin were distilled off at 10 mm. pressure and 120° C. The resin was dissolved in an equal volume of acetone and filtered. The acetone was distilled off at 10 mm. pressure and 120° C. The resin obtained was a pale yellow liquid which had an epoxide equivalent of 228.

EXAMPLE 2

The procedure of Example 1 was repeated using .2 mol of 2,2-bis(p-hydroxyphenyl)-propane, .4 mol of 1,4-bis(p-hydroxycumyl)-benzene, 6 mols of epichlorohydrin and 1.32 mols of a 90% aqueous solution of sodium hydroxide. The resin obtained had an epoxide equivalent of 254.

EXAMPLE 3

The procedure of Example 1 was repeated using .4 mol of 2,2-bis(p-hydroxyphenyl)-propane, .2 mol of 1,4-bis(p-hydroxycumyl)-benzene, 6 mols of epichlorohydrin and 1.32 mols of sodium hydroxide. The resultant resin had an epoxide equivalent of 2.13.

EXAMPLE 4

Cured samples of the epoxide resins of Examples 1–3 were compared with cured samples of the following resins:

(1) An epoxide resin prepared by reacting 1 mol of 1,4-bis(p-hydroxycumyl)-benzene with 10 mols of epichlorohydrin.

(2) A commercially available epoxide resin (Epon 828) prepared by the reaction of Bisphenol A with an excess of epichlorohydrin, said resin having an epoxide equivalent of 205.

(3) A commercially available epoxide resin (Epon 834) prepared by the reaction of Bisphenol A with an excess of epichlorohydrin, said resin having an epoxide equivalent of 260, and (4) A mixture containing one part by weight of the above described 1,4 - bis(p - hydroxycumyl) - benzene epoxide resin and two parts of the above-described Epon 828 resin.

In preparing the cured samples, the epoxide resins were first admixed with m-phenylene diamine at a temperature of about 60° C. using 27 grams of curing agent per epoxide equivalent of resin. The resins were then poured into molds and heated at 150° C. for 6 hours. The physical properties of the molded test samples are given in Table I in which 1,4-bis(p-hydroxycumyl)-benzene is abbreviated as DCP and Bisphenol A is abbreviated as BPA.

A comparison of the BPA/DCP resin of Example 3 with the BPA/DCP mixture indicated that although each contained the same relative amounts of bisphenolic compounds and each has about the same epoxide equivalent, all their physical properties are different and the resin of Example 3 has a substantially higher heat distortion temperature. Also, a comparison of the resin of Example 2 with the second BPA epoxide resin (Epon 834) disclosed that while both have about the same epoxide equivalents, the resin of Example 2 has a substantially higher heat distortion temperature.

ing a mixture of 1,4-bis(p-hydroxycumyl)-benzene, 2,2-bis(p-hydroxyphenyl) - propane, and epichlorohydrin, about ½–2 mols of 2,2-bis(p-hydroxyphenyl) - propane being present per mol of 1,4 - bis(p - hydroxycumyl) benzene and about 5–20 mols of epichlorohydrin being present per mol of dihydric phenol at a temperature of from about 50° C. to about 150° C. in the presence of a sufficient amount of alkali to neutralize the HCl produced during the reaction.

2. A high molecular weight, thermoset polymer prepared by curing the liquid epoxide resin of claim 1 with an amine curing agent.

3. A liquid epoxide resin having an epoxide equivalent above about 220 and curable to a solid polymer of high heat distortion temperature, said resin being obtained by heating a mixture of 1,4 - bis(p - hydroxycumyl) benzene, 2,2-bis(p-hydroxyphenyl)-propane, and epichlorohydrin, about ½–1 mol of 2,2-bis(p-hydroxyphenyl)-propane being present per mol of 1,4-bis(p-hydroxycumyl)-benzene, and about 5–20 mols of epichlorohydrin being present per mol of dihydric phenol at a temperature of from about 50° C. to about 150° C. in the presence of a sufficient amount of alkali to neutralize the HCl produced during the reaction.

4. A thermoset polymer of high heat distortion temperature prepared by curing the liquid epoxide resin of claim 3 with an amine curing agent.

TABLE I.—PHYSICAL TEST DATA

| | DCP epoxide | Epon-834 | Epon-828 | BPA/DCP 1:1 (Ex. 1) | BPA/DCP 1:2 (Ex. 2) | BPA/DCP 2:1 (Ex. 3) | BPA/DCP 2:1 mixture |
|---|---|---|---|---|---|---|---|
| Epoxide equivalent | 286 | 260 | 205 | 228 | 254 | 213 | 217 |
| Ultimate tensile strength, p.s.i.[1] | 6,957 | 9,756 | 12,500 | 12,836 | 10,398 | 11,770 | 13,000 |
| Ultimate elongation, percent [1] | 4.0 | 6.1 | 5.9 | 11.8 | 7.1 | 9.3 | 14.8 |
| Flexural strength, p.s.i.[2] | 16,792 | 17,088 | 18,614 | 17,400 | 18,859 | 16,471 | 19,200 |
| Flexural modulus, p.s.i.[3] | 473,000 | 445,683 | 435,967 | 420,500 | 437,198 | 446,141 | 384,000 |
| Izopod impact, ft.-lbs./in. notch [4] | .46 | .42 | .62 | .60 | .54 | .72 | .75 |
| Rockwell hardness (m.)[5] | 107 | 109 | 104 | 108 | 127 | 126 | 127 |
| Heat distortion temperature, 264 p.s.i./ 0° C.[6] | 131 | 128 | 150 | 147 | 139 | 148.5 | 134 |

[1] ASTM Test D-638-61T.
[2] ASTM Test D-790.
[3] ASTM Test D-695.
[4] ASTM Test D-695.
[5] ASTM Test D-256.
[6] ASTM Test D-648-56.

The accompanying drawing is a graph in which the curve BPA shows heat distortion temperature plotted against epoxide equivalent for epoxide resins based on Bisphenol A as the sole dihydric phenol. The heat distortion temperatures of 150 and 128 for the two commercially available epoxide resins Epon 828 and Epon 834 lie on this curve. The positions of the epoxide resins of the invention in relation to this curve are illustrated by the values R–1, R–2 and R–3 for the resins of Examples 1, 2 and 3, respectively. The location of the heat distortion temperature and epoxide equivalent value for resin mixture No. 4 of Example 4 is represented by the point M–1. It will be observed that the heat distortion temperatures for all of the resins of Examples 1 to 3 fall above the BPA curve, whereas the heat distortion temperature for the BPA/DCP mixture falls well below this curve. The resins of the invention having epoxide equivalents above about 220 (the resins R–1 and R–2) are particularly noteworthy for their high heat distortion temperatures relative to the Bisphenol A resins.

It will be apparent that many modifications and variations can be effected without departing from the scope of the novel concepts of the present invention, and the illustrative details disclosed are not to be construed as imposing undue limitations on the invention.

We claim:

1. A liquid epoxide resin having an epoxide equivalent between about 200 and about 260 and obtained by heat- 5. A process for producing an epoxide resin comprising heat reacting a mixture containing 1,4-bis(p-hydroxycumyl)-benzene, 2,2-bis(p-hydroxyphenyl) - propane, and epichlorohydrin, about ½–2 mols of 2,2-bis(p-hydroxyphenyl)-propane being present per mol of 1,4-bis(p-hydroxycumyl)-benzene and about 5–20 mols of epichlorohydrin being present per mol of dihydric phenol at a temperature of from about 50° C. to about 150° C. in the presence of a sufficient amount of alkali to neutralize the HCl produced during the reaction.

6. A process as claimed in claim 5 wherein said reaction is conducted in the presence of an amount of water equal to about 0.3% to 5% by weight of the total weight of the reactants.

7. A process in accordance with claim 5 wherein said reaction is conducted at a temperature of about 65° C. to 100° C.

8. A process as claimed in claim 5 wherein said alkali is an alkali metal hydroxide and about 2–4 mols of said alkali metal hydroxide are present for each mol of bis-phenolic compound.

9. A process as claimed in claim 8 wherein at least about 1 mol of 1,4-bis(p-hydroxycumyl)-benzene per mol of 2,2-bis(p-hydroxyphenyl)-propane is present and the reaction is conducted in the presence of an amount of water equal to about 0.3% to 5% by weight of the total weight of the reactants.

10. A liquid epoxide resin comprising a diglycidyl ether of the formula:
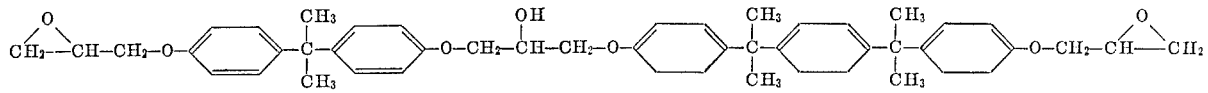
said resin having an epoxide equivalent within the range of about 200 to about 260.
References Cited
UNITED STATES PATENTS
2,857,362   10/1958   Shepherd et al. _____ 260—47
WILLIAM H. SHORT, *Primary Examiner.*
T. D. KERWIN, *Assistant Examiner.*
U.S. Cl. X.R.
161—184; 260—18, 32.8, 348, 830